US010740280B2

(12) United States Patent
Lingam et al.

(10) Patent No.: US 10,740,280 B2
(45) Date of Patent: Aug. 11, 2020

(54) LOW ENERGY ACCELERATOR PROCESSOR ARCHITECTURE WITH SHORT PARALLEL INSTRUCTION WORD

(71) Applicant: TEXAS INSTRUMENTS INCORPORATED, Dallas, TX (US)

(72) Inventors: Srinivas Lingam, Allen, TX (US); Seok-Jun Lee, Allen, TX (US); Johann Zipperer, Unterschleissheim (DE); Manish Goel, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 5 days.

(21) Appl. No.: 15/714,212

(22) Filed: Sep. 25, 2017

(65) Prior Publication Data

US 2018/0018298 A1    Jan. 18, 2018

Related U.S. Application Data

(63) Continuation of application No. 14/678,939, filed on Apr. 4, 2015, now Pat. No. 9,817,791.

(51) Int. Cl.
*G06F 15/80* (2006.01)
*G06F 9/30* (2018.01)
(Continued)

(52) U.S. Cl.
CPC .......... *G06F 15/80* (2013.01); *G06F 9/30014* (2013.01); *G06F 9/30094* (2013.01);
(Continued)

(58) Field of Classification Search
CPC ................................ G06F 9/3887; G06F 15/80
See application file for complete search history.

(56) References Cited

U.S. PATENT DOCUMENTS 5,045,993 A * 9/1991 Murakami ............. G06F 7/575
711/149
5,119,483 A * 6/1992 Madden .................... G06F 9/26
707/999.009

(Continued)

OTHER PUBLICATIONS

MSP Low-Power Microcontrollers, Texas Instruments, www.ti.com/msp, 2015, 41 pgs.

(Continued)

*Primary Examiner* — Michael J Metzger
(74) *Attorney, Agent, or Firm* — Ebby Abraham; Charles A. Brill; Frank D. Cimino

(57) ABSTRACT

Methods and apparatus for a low energy accelerator processor architecture with short parallel instruction word. An integrated circuit includes a system bus having a data width N, where N is a positive integer; a central processor unit coupled to the system bus and configured to execute instructions retrieved from a memory coupled to the system bus; and a low energy accelerator processor coupled to the system bus and configured to execute instruction words retrieved from a low energy accelerator code memory, the low energy accelerator processor having a plurality of execution units including a load store unit, a load coefficient unit, a multiply unit, and a butterfly/adder ALU unit, each of the execution units configured to perform operations responsive to op-codes decoded from the retrieved instruction words, wherein the width of the instruction words is equal to the data width N. Additional methods and apparatus are disclosed.

6 Claims, 15 Drawing Sheets

(51) Int. Cl.
*G06F 9/32* (2018.01)
*G06F 9/38* (2018.01)

(52) U.S. Cl.
CPC .......... *G06F 9/30145* (2013.01); *G06F 9/325* (2013.01); *G06F 9/3822* (2013.01); *G06F 9/3853* (2013.01); *G06F 9/3877* (2013.01)

(56) References Cited

U.S. PATENT DOCUMENTS

| | | | |
|---|---|---|---|
| 5,485,093 | A | 1/1996 | Russell et al. |
| 5,734,575 | A | 3/1998 | Snow et al. |
| 5,784,585 | A | 7/1998 | Denman |
| 5,822,606 | A | 10/1998 | Morton |
| 5,835,392 | A | 11/1998 | Dulong et al. |
| 5,896,305 | A | 4/1999 | Bosshart et al. |
| 5,903,155 | A | 5/1999 | Björklund |
| 5,912,830 | A * | 6/1999 | Krech, Jr. .............. G06F 7/556 708/512 |
| 5,920,497 | A | 7/1999 | Rim |
| 5,961,575 | A | 10/1999 | Hervin et al. |
| 5,978,838 | A | 11/1999 | Mohamed et al. |
| 5,983,256 | A | 11/1999 | Peleg et al. |
| 6,014,684 | A | 1/2000 | Hoffman |
| 6,233,597 | B1 | 5/2001 | Tanoue et al. |
| 6,317,820 | B1 | 11/2001 | Shiell et al. |
| 6,574,724 | B1 | 6/2003 | Hoyle et al. |
| 7,062,526 | B1 | 6/2006 | Hoyle |
| 7,136,265 | B2 | 11/2006 | Wong et al. |
| 7,236,338 | B2 | 6/2007 | Hale et al. |
| 7,281,117 | B2 | 10/2007 | Tanaka et al. |
| 7,386,326 | B2 | 6/2008 | Sundarajan et al. |
| 7,587,577 | B2 | 9/2009 | Royer et al. |
| 7,681,013 | B1 | 3/2010 | Trivedi et al. |
| 7,937,559 | B1 | 5/2011 | Parameswar et al. |
| 8,065,506 | B2 | 11/2011 | Xi et al. |
| 2001/0033469 | A1 | 10/2001 | Macbeth et al. |
| 2001/0037352 | A1 | 11/2001 | Hong |
| 2002/0198911 | A1 | 12/2002 | Blomgren et al. |
| 2003/0196072 | A1 | 10/2003 | Chinnakonda et al. |
| 2005/0005180 | A1 | 1/2005 | Webster |
| 2005/0044434 | A1 * | 2/2005 | Kahle .................. G06F 1/3203 713/320 |
| 2005/0144215 | A1 | 6/2005 | Simkins et al. |
| 2005/0251644 | A1 | 11/2005 | Maher |
| 2008/0071848 | A1 | 3/2008 | Baireddy |
| 2008/0133627 | A1 | 6/2008 | Langhammer et al. |
| 2008/0141012 | A1 | 6/2008 | Yehia et al. |
| 2008/0263285 | A1 | 10/2008 | Sharma et al. |
| 2009/0019262 | A1 | 1/2009 | Tashiro et al. |
| 2009/0063820 | A1 | 3/2009 | Xi et al. |
| 2009/0150654 | A1 | 6/2009 | Oberman et al. |
| 2009/0265409 | A1 | 10/2009 | Peleg et al. |
| 2010/0191979 | A1 | 7/2010 | Zipperer et al. |
| 2010/0211761 | A1 | 8/2010 | Dasgupta |
| 2010/0306292 | A1 | 12/2010 | Catherwood et al. |
| 2013/0145124 | A1 | 6/2013 | Qiu et al. |
| 2014/0280420 | A1 | 9/2014 | Khan |
| 2015/0058389 | A1 | 2/2015 | Blomgren et al. |
| 2015/0121043 | A1 | 4/2015 | Lee et al. |
| 2016/0291974 | A1 | 10/2016 | Lingam |
| 2016/0292127 | A1 | 10/2016 | Lingam |
| 2017/0060586 | A1 | 3/2017 | Lingam |
| 2018/0018298 | A1 | 1/2018 | Lingam et al. |

OTHER PUBLICATIONS

Plant et al., "MSP432 Microcontrollers: Bringing High Performance to Low-Power Applications", Texas Instruments, Mar. 2015, 11 pgs.
Intel, "IA-64 Application Developer's Architecture Guide," May 1999, pp. 7: 154-158; C:16, 18-19, 23.
Hewlett Packard, "PA-RISC 2.0", 1995, pp. 2:18, 7:60, 62.
Texas Instruments, "The MSP430 Hardware Multiplier—Function and Applications", Application Report SLAA042, Apr. 1999 (34 pages).
SGS-Thomson Microelectronics, "D950-Core: 16-Bit Fixed Point Digital Signal Processor (DSP) Core", Sep. 4 1997 (89 pages).
International Search Report and Written Opinion, PCT/US 2017/067030, dated Apr. 5, 2018, 7 pages.

* cited by examiner

FIG. 7

| 0 | 1 2 3 4 5 6 7 8 9 10 11 | 12 | 13 14 15 16 17 18 19 | 20 21 22 23 24 25 26 27 28 29 30 31 |
|---|---|---|---|---|
| 0 | | | par_mpy_bfly_ls_ld | |

| | ls : ldstA | ld : ld_R | m : mpy | b : bfly |
|---|---|---|---|---|
| | ld_ARc | ld_R_rdx2 | mpy_opn | bfly_opn |
| 00 | st_A | 0 | mpyl_opn | op : bfly_op | s1 : mRc | s2 : mRc | d1 : mRc |
| 0110 | st_ovf_A | 0 | nop | | i : t3u | i : t3u | i : t3u |
| 0111 | add_ptrs | nop | nop | 000 ADDC | | | |
| 010 | nop | 1 | 11xxxx | 001 SUBC | | | |
| | 1xxxxxxxxx | | | 010 ADDH_SUBL | | | |
| | | | | 011 SUBH_ADDL | | | |
| | | | | 100 ADDL | | | |
| | | | | 101 SUBL | | | |
| | | | | 110 SHR_ADDSU | | | |
| | | | | 111 SHR_ADDSS | | | |
| | | | | 11000 minmax | | | |
| | | | | 11001 minmax_sh | | | |
| | | | | 11010 cmpr | | | |
| | | | | 10 pass | | | |
| | | | | nop | | | |
| | | | | 111xxxxxxxxxxx | | | |
| 11100xxxxxxxxxxxxxxxx | | | | | | | |
| 11010xxxxxxxxxxxxxxxx | | | | | | | |
| 11011xxxxxxxxxxxxxxxx | | | | | | | |
| 10000xxxxxxxxxxxxxxxx | | | pass | | | | |
| | | | cmpr | | | | |
| 10001xxxxxxxxx | | | load_imm | | | | |
| 101xxxxxxxxx | | | load_zero | load_cnt | | | lshift |
| 110000xxxxxxxxx | | | return | doloop | | | rshift |
| 110001xxxxxxxxx | | | | | | | |
| 11101xxxxxxxxxxxxxxxxxxxx | | | | | | | |

700

800

| 0 | 1 | 2 | 3 | 4 | 5 | 6 | 7 | 8 | 9 | 10 | 11 |
|---|---|---|---|---|---|---|---|---|---|---|---|
| 0 | | | | ls : ldstA | | | | | | | |
| | 00 | | | | ld_ARc | | | | | | |
| | | | | d : mRcLDC | m : addr_modeA | | | | | | s : scl_modeA |
| | | | 0 | mRcLd | m : eAddr_mode | | sd : mPM | ss : mSP | | | s : eScl_mode |
| | | | | ld0_reg | 00 add | | i : t2u | i : t2u | | | 0 ns |
| | | | | 0 | 01 sub | | | | | | 1 sscale |
| | | | | ld1_reg | 10 incr_mask | | | | | | |
| | | | | 1 | 11 brev | | | | | | |
| | | | 1 | mMdcRegs | | | | | | | |
| | | | | mdata_reg | | | | | | | |
| | | | | 0 | | | | | | | |
| | | | | mcoef_reg | | | | | | | |
| | | | | 1 | | | | | | | |
| | 011 | | | | st_A | | | | | | 0 |
| | | | | s : eRcSt | m : addr_modeA | | | | | | |
| | | | | 0 c4 | m : eAddr_mode | | sd : mPM | ss : mSP | | | |
| | | | | 1 c5 | 00 add | | i : t2u | i : t2u | | | |
| | | | | | 01 sub | | | | | | |
| | | | | | 10 incr_mask | | | | | | |
| | | | | | 11 brev | | | | | | |
| | 011 | | | | st_ovf_A | | | | | | 1 |
| | | | | s : eRcSt | m : addr_modeA | | | | | | |
| | | | | 0 c4 | m : eAddr_mode | | sd : mPM | ss : mSP | | | |
| | | | | 1 c5 | 00 add | | i : t2u | i : t2u | | | |
| | | | | | 01 sub | | | | | | |
| | | | | | 10 incr_mask | | | | | | |
| | | | | | 11 brev | | | | | | |

| 0 | 1 | 2 | 3 | 4 | 5 | 6 | 7 | 8 | 9 | 10 | 11 |
|---|---|---|---|---|---|---|---|---|---|---|---|
| 0 | 10 | | | | | ld_noupd_ARc | | | | | |
| | | | | d : mRcLDC | | 00 | sd : mPM | | | 000 | |
| | | | | 0 | mRcLd | | i : t2u | | | | |
| | | | | 1 | mMdcRegs | | | | | | |
| | 10 | | | | | ld_cb_ARc | | | | | |
| | | | | d : mRcLDC | 1 | m : addr_cb_modeA | | | | 0 | |
| | | | | 0 | mRcLd | m : eCbAddr_mode | sd : mPM | | ss : mSP | | |
| | | | | 1 | mMdcRegs | 0  add | i : t2u | | i : t2u | | |
| | | | | | | 1  sub | | | | | |
| | | | | 100001 | | | | | brev_inc_ptrs | | |
| | | | | | | | s1 : mPM | | s2 : mSP | 0 | |
| | | | | | | | i : t2u | | i : t2u | | |
| | 010 | | | | | add_ptrs | | | | | |
| | | | | s1 : mAguRegs | | | s2 : mAguRegs | | | | |
| | | | | e : eAguRegs | | | e : eAguRegs | | | | |
| | | | | 0000  sa0 | | | 0000  sa0 | | | | |
| | | | | 0001  sa1 | | | 0001  sa1 | | | | |
| | | | | 0010  sa2 | | | 0010  sa2 | | | | |
| | | | | 0011  ma | | | 0011  ma | | | | |
| | | | | 0100  pa0 | | | 0100  pa0 | | | | |
| | | | | 0101  pa1 | | | 0101  pa1 | | | | |
| | | | | 0110  pa2 | | | 0110  pa2 | | | | |
| | | | | 0111  pa3 | | | 0111  pa3 | | | | |
| | | | | 1000  pr | | | 1000  pr | | | | |
| | | | | 1001  mr | | | 1001  mr | | | | |
| | | | | 1010  sr | | | 1010  sr | | | | |
| | | | | 1011  sr2 | | | 1011  sr2 | | | | |
| | | | | 1100  sov | | | 1100  sov | | | | |
| | | | | 1101  scl | | | 1101  scl | | | | |
| | | | | | | nop | | | | | |
| | | | | | | 11111111111 | | | | | |

| 12 |
| --- |
| ld : ld_R |
| ld_R_rdx2 |
| 0 |
| nop |
| 1 |

| 13 | 14 | 15 | 16 | 17 | 18 |
|---|---|---|---|---|---|
| | | m : mpy ||||
| | 10 | mpy_opn ||||
| | | s1 : mdreg | s2 : mcreg | dst : mRMo ||
| | | mdr_reg | mcr_reg | mRrMo ||
| | | 0 | 0 | mor0_reg ||
| | | mdi_reg | mci_reg | 00 ||
| | | 1 | 1 | mor1_reg ||
| | | | | 01 ||
| | | | | mRiMo ||
| | | | | moi0_reg ||
| | | | | 10 ||
| | | | | moi1_reg ||
| | | | | 11 ||
| 0 | | mpyl_opn ||||
| | | op : mul2_op | s1 : mdreg | s2 : mcreg | dst : mRcMo |
| | | 00  MULSS | mdr_reg | mcr_reg | mo0_reg |
| | | 01  MULSU | 0 | 0 | 0 |
| | | 10  MULUS | mdi_reg | mci_reg | mo1_reg |
| | | 11  MULUU | 1 | 1 | 1 |
| | | nop ||||
| | | 111111 ||||

| 19 | 20 | 21 | 22 | 23 | 24 | 25 | 26 | 27 | 28 | 29 | 30 | 31 |
|---|---|---|---|---|---|---|---|---|---|---|---|---|
| 0 | bfly_opn ||||||||||||
| | op : bfly_op ||| s1 : mRc ||| s2 : mRc ||| d1 : mRc |||
| | 000 ADDC ||| i : t3u ||| i : t3u ||| i : t3u |||
| | 001 SUBC ||||||||||||
| | 010 ADDH_SUBL ||||||||||||
| | 011 SUBH_ADDL ||||||||||||
| | 100 ADDL ||||||||||||
| | 101 SUBL ||||||||||||
| | 110 SHR_ADDSU ||||||||||||
| | 111 SHR_ADDSS ||||||||||||
| | 11000 |||| minmax ||||||||
| | |||| op : minmax_op ||| s1 : mRc ||| s2 : mRc |||
| | |||| 00 MAX ||| i : t3u ||| i : t3u |||
| | |||| 01 MAXU ||||||||
| | |||| 10 MIN ||||||||
| | |||| 11 MINU ||||||||
| | 11001 |||| minmax_sh ||||||||
| | |||| op : minmax_sh_op ||| s1 : mRc ||| s2 : mRc |||
| | |||| 00 MAX ||| i : t3u ||| i : t3u |||
| | |||| 01 MAXU ||||||||
| | |||| 10 MIN ||||||||
| | |||| 11 MINU ||||||||
| | 1101 |||| cmpr ||||||||
| | |||| 0 | compare_rcrc |||||||
| | |||| | op : compare_op ||| s1 : mRc ||| s2 : mRc |||
| | |||| | 00 lt ||| i : t3u ||| i : t3u |||
| | |||| | 01 ltu ||||||||
| | |||| | 10 gt ||||||||
| | |||| | 11 gtu ||||||||
| | |||| 1 | compare_rr |||||||
| | |||| | op : compare_op ||| 0 | s1 : mRLd || 0 | s2 : mRLd ||
| | |||| | 00 lt ||| | mRrLd || | mRrLd ||
| | |||| | 01 ltu ||| | ldr0_reg || | ldr0_reg ||
| | |||| | 10 gt ||| | 00 || | 00 ||
| | |||| | 11 gtu ||| | ldr1_reg || | ldr1_reg ||
| | |||| | |||| | 01 || | 01 ||
| | |||| | |||| | mRiLd || | mRiLd ||
| | |||| | |||| | ldi0_reg || | ldi0_reg ||
| | |||| | |||| | 10 || | 10 ||
| | |||| | |||| | ldi1_reg || | ldi1_reg ||
| | |||| | |||| | 11 || | 11 ||

| 19 | 20 | 21 | 22 | 23 | 24 | 25 | 26 | 27 | 28 | 29 | 30 | 31 |
|----|----|----|----|----|----|----|----|----|----|----|----|----|
| 1110 | | | | | arith_opn | | | | | | | |
| | | | | arith | s1 : mR | | | | s2 : mR | | | |
| | | | | ADI | mRr | | | | mRr | | | |
| | | | | SUB | 0 | i : t3u | | | 0 | i : t3u | | |
| | | | | | mRi | | | | mRi | | | |
| | | | | | 1 | i : t3u | | | 1 | i : t3u | | |
| 11110 | | | | | select_opn | | | | | | | |
| | | | | | s1 : mR | | | | s2 : mR | | | |
| | | | | | mRr | | | | mRr | | | |
| | | | | | 0 | i : t3u | | | 0 | i : t3u | | |
| | | | | | mRi | | | | mRi | | | |
| | | | | | 1 | i : t3u | | | 1 | i : t3u | | |
| 10 | | | | | pass | | | | | | | |
| | 000 | | | | mv_RR | | | | | | | |
| | | | | | s1 : mR | | | | dst : mR | | | |
| | | | | | mRr | | | | mRr | | | |
| | | | | | 0 | i : t3u | | | 0 | i : t3u | | |
| | | | | | mRi | | | | mRi | | | |
| | | | | | 1 | i : t3u | | | 1 | i : t3u | | |
| | 01000 | | | | | mv_RcRc | | | | | | |
| | | | | | | s1 : mRc | | | dst : mRc | | | |
| | | | | | | i : t3u | | | i : t3u | | | |
| | 01010 | | | | | sel_RcRc | | | | | | |
| | | | | | | s1 : mRc | | | dst : mRc | | | |
| | | | | | | i : t3u | | | i : t3u | | | |
| | 001 | | | | mv_RcR | | | | | | | |
| | | op : xtwl_op | | | | s1 : mR | | | dst : mRc | | | |
| | | 0 xts | | | | mRr | | | i : t3u | | | |
| | | 1 xtz | | | 0 | i : t3u | | | | | | |
| | | | | | mRi | | | | | | | |
| | | | | | 1 | i : t3u | | | | | | |
| | 100 | | | | mv_RAg | | | | | | | |
| | | | | | s1 : mAguRegs | | | | dst : mR | | | |
| | | | | | e : eAguRegs | | | | mRr | | | |
| | | | | | | | | | 0 | i : t3u | | |
| | | | | | | | | | mRi | | | |
| | | | | | | | | | 1 | i : t3u | | |
| | 110 | | | | mv_AgR | | | | | | | |
| | | | | | src : mR | | | | dst : mAguRegs | | | |
| | | | | | mRr | | | | e : eAguRegs | | | |
| | | | | | mRi | | | | | | | |
| | 101 | | | | sel_mv_RAg | | | | | | | |
| | | | | | s1 : mAguRegs | | | | dst : mR | | | |
| | | | | | e : eAguRegs | | | | mRr | | | |
| | | | | | | | | | mRi | | | |

1400

| 19 | 20 | 21 | 22 | 23 | 24 | 25 | 26 | 27 | 28 | 29 | 30 | 31 |
|---|---|---|---|---|---|---|---|---|---|---|---|---|
| | | | | | 001 | mv_RcR | | | | | | |
| | | | | | | op : xtwl_op | | s1 : mR | | | dst : mRc | |
| | | | | | | 0 xts | | mRr | | | i : t3u | |
| | | | | | | 1 xtz | 0 | i : t3u | | | | |
| | | | | | | | | mRi | | | | |
| | | | | | | | 1 | i : t3u | | | | |
| | | | | | 100 | mv_RAg | | | | | | |
| | | | | | | s1 : mAguRegs | | | dst : mR | | | |
| | | | | | | e : eAguRegs | | | mRr | | | |
| | | | | | | | | | 0 | i : t3u | | |
| | | | | | | | | | mRi | | | |
| | | | | | | | | | 1 | i : t3u | | |
| | | | | | 110 | mv_AgR | | | | | | |
| | | | | | | src : mR | | | dst : mAguRegs | | | |
| | | | | | | mRr | | | e : eAguRegs | | | |
| | | | | | | mRi | | | | | | |
| | | | | | 101 | sel_mv_RAg | | | | | | |
| | | | | | | s1 : mAguRegs | | | dst : mR | | | |
| | | | | | | e : eAguRegs | | | mRr | | | |
| | | | | | | | | | mRi | | | |
| | | | | 1110 | | mv_LcR | | | | | | |
| | | | | | | src : mR | | | dst : mLcRegs | | | |
| | | | | | | mRr | | | e : eLcRegs | | | |
| | | | | | | 0 | i : t3u | | 000 Cnt | | | |
| | | | | | | mRi | | | 001 LP | | | |
| | | | | | | 1 | i : t3u | | 010 LC0 | | | |
| | | | | | | | | | 011 LS0 | | | |
| | | | | | | | | | 100 LE0 | | | |
| | | | | | | | | | 101 LC1 | | | |
| | | | | | | | | | 110 LS1 | | | |
| | | | | | | | | | 111 LE1 | | | |
| | | | | | | mv_RLc | | | | | | |
| | | | | 1111 | | s1 : mLcRegs | | | dst : mR | | | |
| | | | | | | e : eLcRegs | | | mRr | | | |
| | | | | | | | | | mRi | | | |

| 19 | 20 | 21 | 22 | 23 | 24 | 25 | 26 | 27 | 28 | 29 | 30 | 31 |
|---|---|---|---|---|---|---|---|---|---|---|---|---|
| | | 1111 | | | | | | | mv_RLc | | | |
| | | | | | | s1 : mLcRegs | | | dst : mR | | | |
| | | | | | | e : eLcRegs | | | mRr | | | |
| | | | | | | | | | mRi | | | |
| | | 0100100 | | | | | | | mv_PAg | | | |
| | | | | | | src : mAgPPRegs | | | dst : mPpAgRegs | | | |
| | | | | | | mPM | | | e : ePpAgRegs | | | |
| | | | | | | i : t2u | | | 00  PPSrcL0 | | | |
| | | | | | | | | | 01  PPSrcL1 | | | |
| | | | | | | | | | 10  PPSPL | | | |
| | | 0100101 | | | | | | | mv_AgP | | | |
| | | | | | | src : mPpAgRegs | | | dst : mAgPPRegs | | | |
| | | | | | | e : ePpAgRegs | | | mPM | | | |
| | | | | | | 00  PPSrcL0 | | | i : t2u | | | |
| | | | | | | 01  PPSrcL1 | | | | | | |
| | | | | | | 10  PPSPL | | | | | | |
| | | 0100110 | | | | | | | mv_PRc | | | |
| | | | | | | src : mRcId | | | dst : mPpRegs | | | |
| | | | | | | Id0_reg | | | e : ePpRegs | | | |
| | | | | | | 0 | | | 000  PPSrc0 | | | |
| | | | | | | Id1_reg | | | 001  PPSrc1 | | | |
| | | | | | | 1 | | | 010  PPDst | | | |
| | | | | | | | | | 011  PPSP | | | |
| | | | | | | | | | 100  PPCmdCtrl | | | |
| | | | | | | | | | 101  PPStatus | | | |
| | | | | | | | | | 110  PPClkCtrl | | | |
| | | 0100111 | | | | | | | mv_RcP | | | |
| | | | | | | src : mPpRegs | | | | | dst : mRcSt | |
| | | | | | | e : ePpRegs | | | | | st0_reg | |
| | | | | | | 000  PPSrc0 | | | | | 0 | |
| | | | | | | 001  PPSrc1 | | | | | st1_reg | |
| | | | | | | 010  PPDst | | | | | 1 | |
| | | | | | | 011  PPSP | | | | | | |
| | | | | | | 100  PPCmdCtrl | | | | | | |
| | | | | | | 101  PPStatus | | | | | | |
| | | | | | | 110  PPClkCtrl | | | | | | |
| | | nop | | | | | | | | | | |
| | | 11111111111 | | | | | | | | | | |

| 0 1 2 3 4 5 6 7 8 9 10 11 12 13 14 15 | 16 17 18 19 20 21 22 23 24 25 26 27 28 | 29 | 30 | 31 |
|---|---|---|---|---|
| 10101xxxxxxxxxxxxxxxxxxxxxxxx | | | smr_lrshift | |
| | | 0 | lshift | |
| | | | sd : mSM | sf : shift factor |
| | | | e : eSM | e : eShift |
| | | | 0 sa0 | 0 one |
| | | | 1 ma | 1 two |
| | | 1 | rshift | |
| | | | sd : mSr | sf : shift_factor |
| | | | e : eSr | e : eShift |
| | | | 0 sr | 0 one |
| | | | 1 sr2 | 1 two |

| 1000xxx | | | ld imm | |
| --- | --- | --- | --- | --- |
| | 00xxx | | load_imm | |
| | | d : mAguRegs | imm : word16 | |
| | | e : eAguRegs | | |
| | 01xxx | | load Rimm | |
| | | d : mR | imm : word16 | |
| | | mRr | | |
| | | 0 | i : t3u | |
| | | mRi | | |
| | | 1 | i : t3u | |
| | 10xxx | | load zero | |
| | | 0 | d : mRc | 0000000000000000 |
| | | | i : t3u | |
| | 11xxxxxx | | load_cnt | |
| | | | imm : word16 | |
| | | | ls sp off | |
| 1001xxx | 00xxx | | load R sp idx imm | |
| | | d : mR | 0000000000 | offs : t6u |
| | | mRr | | |
| | | mRi | | |
| | 01xxx | | store R sp idx imm | |
| | | s : mR | 0000000000 | offs : t6u |
| | | mRr | | |
| | | mRi | | |
| | 10xxxx | | load_Rc_sp_idx imm | |
| | | d : mRc | 0000000000 | offs : t6u |
| | | i : t3u | | |
| | 11xxxx | | store Rc sp idx imm | |
| | | s : mRc | 0000000000 | offs : t6u |
| | | i : t3u | | |
| 10100xxxxxxxxxxx | | | add_imm_SP | |
| | | | offs : word16 | |
| 1011xxx | | | pc dcnt | |
| | 00xxxxxxx | | doloop | |
| | | | end : word16 | |
| | | | return | |
| | 01xxxxxxxxxxxxxxxxxxxxxx | | | |
| | | | reti | |
| | 10xxxxxxxxxxxxxxxxxxxxxxx | | | |

LOW ENERGY ACCELERATOR PROCESSOR ARCHITECTURE WITH SHORT PARALLEL INSTRUCTION WORD

CROSS-REFERENCE TO RELATED APPLICATION(S)

This continuation application claims priority to U.S. patent application Ser. No. 14/678,939, filed Apr. 4, 2015, which application is related to U.S. patent application Ser. No. 14/678,944, filed Apr. 4, 2015, both of which are hereby incorporated herein by reference in their entirety.

TECHNICAL FIELD

The present application relates to microprocessors such as are used for control systems and for applications with processing data from sensors, and in particular to the use of microprocessor units (MPUs) in control applications where lower power consumption is of particular importance, such as in portable battery powered devices. Mobile telecommunications, industrial control, automotive, and cellular applications are example applications for these microprocessor units, which, when used in control applications are referred to as "microcontrollers" or "MCUs." In particular, the present application relates to the use of microcontrollers including a low energy accelerator processor for accelerating commonly performed vector operations with a lower power consumption.

BACKGROUND

Microcontroller units (MCUs) are increasingly used in systems for providing automated control and for sensing applications. Example applications for MCUs include industrial controls, medical instruments and medical technologies, metering including remote metering such as utility and network metering, automotive applications, telecommunications including cellular base stations, and use on a variety of portable computing platforms including tablet computers, smart watches, smart phones, and the like. Additional applications include remote sensing and equipment monitoring, RF tag sensing such as used in toll systems, retail security and asset location, and in enabling "Internet of Things" or "IoT" applications. Demand for portable and battery powered implementations for MCUs are increasing. Because these applications often require receiving analog signals as inputs from sensing devices, mixed signal processors (MSPs) have also been introduced. Prior known MSP devices often include embedded analog to digital converters and analog comparison functions along with microprocessor units. The analog circuitry is used to receive analog input signals and to convert these to digital representations for use in performing computations. Additional example analog sensors include pressure, temperature, speed and rotation sensors, gyroscopes, accelerometers, optical sensors and the like.

While embedded microprocessors are currently used in MCUs and MSPs to perform various functions, these devices are increasingly used in applications where both stand-by and active device power consumption are of great importance. While adding functionality to increase computational performance of a microcontroller unit is always desirable, and demand for these added computation features is always increasing, the need for reduced power consumption is also increasing. Reducing power consumption results in longer battery life, extending time between battery charges or between battery replacements, and increases the time between needed services of remote sensing equipment, for example. For a portable consumer device, a battery life of at least one day in very active use is particularly desirable so that the consumer does not have to find a charging location while using the device away from home or office locations, for example.

Data processing tasks that are commonly performed by such mixed signal control and sensing devices typically include vector operations. Vector operations are often used in signal processing applications. Typical operations using vector computations include Fourier transforms such as Fast Fourier Transforms (FFT), Finite Impulse Response filtering (FIR), Infinite Impulse Response (IIR), cryptanalysis computations, and similar vector functions. While the microprocessor embedded within a microcontroller device needs to be able to perform general processing computing functions such as controlling memory accesses, data input and output functions, display and user input, communications, data transmission and the like, the need for performing these vector arithmetic functions creates a challenge for efficient computation in most general purpose microprocessors. In order to achieve high computation performance for these vector operations, a variety of prior known approaches have been used. In one approach, a digital signal processor (DSP) can be added to an integrated circuit MCU or to an integrated circuit or module that includes a microprocessor unit. While the added DSP can efficiently perform certain signal processing functions such as vector operations much faster than can be achieved by using software running instructions on the MPU, the added DSP also substantially increases the number of transistors (increases gate count) and silicon area used to implement the integrated microcontroller device, and the corresponding costs for device production also rise. Further the addition of a DSP to a microcontroller device adds additional functionality and increases silicon area for certain features of the DSP which are not necessary just for performing the vector operations. In addition, because for CMOS semiconductor technology currently in use, in CMOS integrated circuit devices the power consumed is roughly directly proportional to the number of transistors (or gates) on the device, active device power consumption tends to increase in roughly direct proportion with increasing device performance when this approach is used. This is problematic for any integrated circuit design and is particularly undesirable for the applications considered here, where in fact a substantial decrease in power consumption is needed.

Additional prior known approaches include the use of dedicated hardware accelerators specifically designed to perform certain vector operations. While performance will be increased using these dedicated hardware accelerators for each vector operation to be computed, this approach also tends to increase silicon area as a separate hardware function is added for each type of vector computation to be accelerated. Further the time to market and integrated circuit design process can be quite lengthy when using a dedicated hardware solution, as the dedicated hardware needs to be changed to address different applications. While computational performance will be increased when a dedicated hardware block is used to execute certain vector computations, the disadvantages of non-flexibility and an inability to modify the computations outweigh the potential benefits. Further, dedicated hardware accelerators are not used for operations other than the particular dedicated function are being performed, so the integrated circuit designs with dedicated hardware accelerators can be an inefficient use of silicon area, depending on how often the particular function is performed.

A continuing and increasing need thus exists for an accelerator processor architecture that is compatible with current and future CMOS integrated circuit technology, which is optimized for commonly used vector arithmetic operations, and which provides excellent computational performance with reduced silicon area and reduced gate count and correspondingly, exhibits reduced power consumption when compared to the prior known solutions.

SUMMARY

In the arrangements that form various aspects of the present application, an accelerator processor architecture with an optimized instruction set for selected applications is provided that overcomes the deficiencies and disadvantages of the prior known approaches. The novel accelerator processor uses a short parallel instruction word architecture with an optimized instruction set to achieve high computational performance with reduced power.

In an illustrative arrangement that forms an aspect of the present application, an integrated circuit includes a system bus for transferring data between memory devices, processors, and peripheral devices having a data width N, where N is a positive integer; a central processor unit coupled to the system bus and configured to execute instructions retrieved from a memory coupled to the system bus; and a low energy accelerator processor coupled to the system bus and configured to execute instruction words retrieved from a low energy accelerator code memory coupled to the system bus, the low energy accelerator processor having a plurality of execution units including a load store unit, a load coefficient unit, a multiply unit, and a butterfly/adder ALU unit, each of the execution units configured to perform operations responsive to op-codes decoded from the retrieved instruction words, wherein the width of the instruction words is equal to the data width N of the system bus.

In a further arrangement, the integrated circuit described above includes wherein the low energy accelerator processor further comprises the multiply unit and the butterfly/adder ALU unit configured to execute fixed point instructions.

In another arrangement that forms an additional aspect of the present application, the integrated circuit described above includes a peripheral bridge unit coupled to the system bus and configured to communicate data to and from additional circuitry.

In still another arrangement, the above described integrated circuit further includes additional circuitry that includes analog circuitry. In another alternative arrangement, in the above described integrated circuit, the analog circuitry further includes an analog to digital converter circuit.

In still a further alternative arrangement, in the above described integrated circuit, the instruction words stored for the low energy accelerator processor include instruction words to cause the low energy accelerator to perform vector computations.

In another alternative arrangement, in the above described integrated circuit, the low energy accelerator further includes the multiply unit and the butterfly/adder ALU unit configured to perform operations in floating point and fixed point computations.

In a further alternative arrangement, in the above described integrated circuit, wherein the integrated circuit further includes an operand overload register containing a flag indicating a floating point computation.

In still another additional arrangement, in the above described integrated circuit, the instruction words for the low energy accelerator processor have an instruction word length of 32 bits or less. In yet another alternative arrangement, in the above described integrated circuit, the instruction words for the low energy accelerator processor have a field of 11 bits containing opcodes for the load store unit. In a further alternative arrangement, in the above described integrated circuit, and the instruction words for the low energy accelerator processor have a field of 1 bits containing opcodes for the load coefficient unit.

In another alternative arrangement, in the above described integrated circuit, the instruction words for the low energy accelerator processor have a field of 6 bits for the multiply unit. In still a further alternative arrangement, the above described integrated circuit is provided wherein the instruction words for the low energy accelerator processor have a field of 13 bits for the butterfly/adder ALU unit.

In another arrangement that forms an additional aspect of the present application, a data processor includes: a system bus coupled to at least one memory and having a data width of N, where N is a positive integer; and a low energy accelerator processor coupled to the system bus and configured to execute parallel instruction words retrieved from the memory responsive to a memory address from a program controller, and further includes a load store execution unit configured to load data from a memory location and store the load data to registers in the low energy accelerator processor; a load coefficient execution unit configured to load a coefficient from a register; a multiply execution unit configured to perform multiply operations on data from registers and store a result in a destination register; and a ALU execution unit configured to perform butterfly and ADD operations on data from registers and store a result in a destination register; wherein the parallel instruction words have a length of less than or equal to N, the data width of the system bus.

In an additional arrangement, the data processor described above is provided and further includes a central processor unit coupled to the system bus. In still another alternative arrangement, the data processor described above is provided wherein the low energy accelerator processor is further configured to execute fixed point and floating point computations. In a further alternative arrangement, the above described data processor is provided wherein the multiply execution unit configured to perform multiply operations in fixed point and floating point form responsive to an operand overload flag indicating a floating point operation; the ALU execution unit is configured to perform butterfly and ADD operations in fixed point and floating point responsive to the operand overload flag indicating a floating point operation; and the low energy accelerator processor further includes an operand overload register outputting the operand overload flag. In a further alternative arrangement, the above described data processor is provided, wherein N is less than or equal to 32.

In another alternative arrangement that forms an additional aspect of the present application, a microcontroller unit includes a system bus having a data width of 32; a central processing unit coupled to the system bus; a low energy accelerator processor coupled to the system bus and configured to execute short parallel instruction words, and further comprising: a load store execution unit; a load coefficient unit; a multiply unit; and a butterfly/ADD ALU unit; and a non-volatile instruction word memory coupled to the system bus and containing short parallel instruction words for execution by the low energy accelerator processor, the short parallel instruction words having a length equal to the data width of 32.

In still another alternative arrangement, the above described microcontroller unit is provided and further includes the multiply unit and the butterfly/ADD ALU unit further configured to execute fixed point and floating point computations responsive to an operand overload flag; and a floating point operand overload register containing the operand overload flag.

Various alternative arrangements that form additional aspects of the present application are also described below which are contemplated by the inventors and which fall within the scope of the appended claims.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which:

FIG. 7 depicts in a table a summary of an instruction set architecture arrangement of the present application;

FIG. 8 depicts in an another table further details of the instruction set architecture arrangement of the present application;

FIG. 9 depicts in an another table further details of the instruction set architecture arrangement of the present application;

FIG. 10 depicts in an another table further details of the instruction set architecture arrangement of the present application;

FIG. 11 depicts in an another table further details of the instruction set architecture arrangement of the present application;

FIG. 12 depicts in an another table further details of the instruction set architecture arrangement of the present application;

FIG. 13 depicts in yet another table further details of the instruction set architecture arrangement of the present application;

FIG. 14 depicts in yet another table further details of the instruction set architecture arrangement of the present application;

FIG. 15 depicts in a further table additional details of the instruction set architecture arrangement of the present application; and FIG. 16 depicts in a further table additional details of the instruction set architecture arrangement of the present application.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

Figure 1:
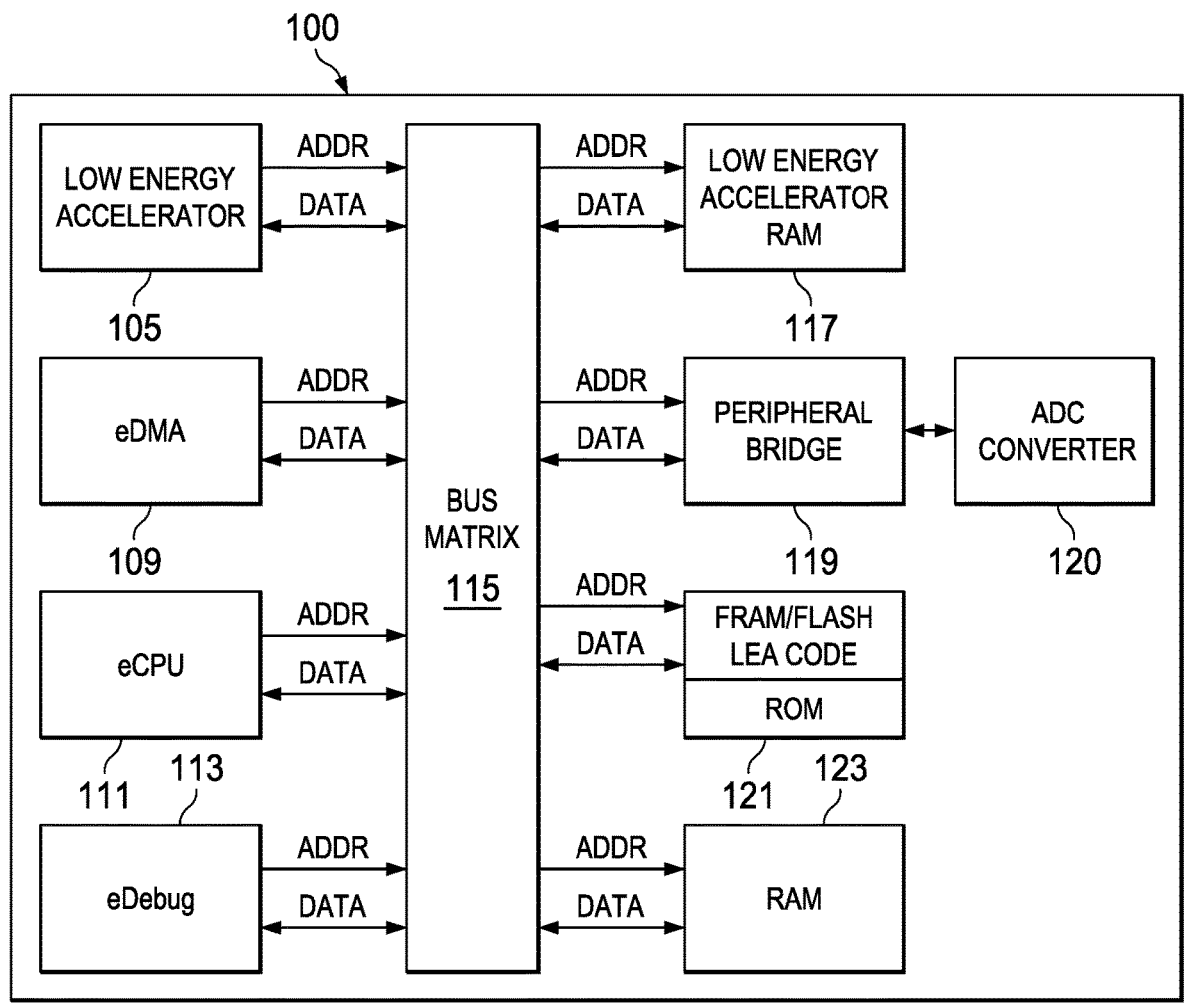
FIG. 1 depicts in a block diagram an example arrangement processing system including an example low energy accelerator processor of the present application.

The making and using of various example illustrative arrangements that incorporate aspects of the present application are discussed in detail below. It should be appreciated, however, that the illustrative examples disclosed provide many applicable inventive concepts that can be embodied in a wide variety of specific contexts. The specific examples and arrangements discussed are merely illustrative of specific ways to make and use the various arrangements, and the examples described do not limit the scope of the specification, nor do they limit the scope of the appended claims.

For example, when the term "coupled" is used herein to describe the relationships between elements, the term as used in the specification and the appended claims is to be interpreted broadly, and while the term "coupled" includes "connected," the term "coupled" is not to be limited to "connected" or "directly connected" but instead the term "coupled" may include connections made with intervening elements, and additional elements and various connections may be used between any elements that are described as "coupled."

In an aspect of the present application, an application specific integrated processor (ASIP) architecture is provided in the form of a low energy accelerator processor (LEA processor). The LEA processor is optimized for vector computations and arranged to require a lower gate count than prior known processor accelerator approaches, and is optimized to provide a lower active power consumption. The arrangements of the low energy accelerator processor include an optimized instruction set and an architecture optimized for selected vector computations. In an example arrangement, the LEA instruction set and an optimized architecture includes a short parallel instruction word (SPIW) having an instruction word length that matches a memory system data bus width, thereby increasing system bus performance and reducing the number of bus driver devices needed to provide a new instruction word for execution on each clock cycle. In an alternative arrangement, the short parallel instruction word may have a length equal to two memory data words. In addition the arrangements of the present application incorporate an instruction set architecture (ISA) for the LEA processor that is optimized for selected vector oriented computations such as are used in FFT, FIR and IIR computations, for cryptography, and like operations. In the LEA, address registers and data registers are provided separately. The address registers are non-orthogonal to the execution units, and are arranged to optimize certain vector operations while the connections between the address registers and the various execution units are optimized and/or minimized to reduce silicon area. The data registers are further arranged in a non-orthogonal data register file in a manner which, in combination with the optimized instruction set architecture, provides support for vector operations, yet is implemented with a further reduced gate count and reduced silicon area when compared to fully orthogonal data register files used in prior known processor architectures.

FIG. 1 illustrates, in a simplified block diagram, a microcontroller system that incorporates features of the present application. In system 100, which can be arranged on a single integrated circuit as a "system on an integrated circuit" (SOIC), or which can be arranged in further alternative approaches as a multiple chip module or circuit board, a bus matrix 115 couples various functional blocks to one another. In this example arrangement, LEA processor 105 is coupled to the bus matrix 115 and incorporates the novel features of the present application. In addition, various additional embedded functional units are provided as part of system 100. An embedded central processor unit (eCPU) 111 is provided to perform general computing tasks and to support various input and output functions, memory accesses, data store and retrieval operations, and communications with external devices. An embedded direct memory access (eDMA) function 100 is coupled to the bus matrix 115 and provides a means to access external memory such as DRAM or FLASH storage outside the system 100. A software debug module (eDebug) 113 can be provided and coupled to the bus matrix 115. Memory for use by the LEA 105, for example, embedded RAM such as static RAM (SRAM) or dynamic RAM (DRAM), is provided and labeled Low Energy Accelerator RAM 117. The LEA 105 can use this memory for data storage and for storing intermediate results. Peripheral Bridge unit 119 is arranged to couple various additional peripheral units (not shown in FIG. 1, for simplicity) to the bus matrix 115 and thus to the eCPU 111, and/or to the LEA 105. Additional peripheral units such as bus interface units for test bus, scan bus, USB, and other bus interfaces can be coupled to the Peripheral Bridge 119. In addition, various application specific peripheral units such as analog to digital converters (ADC), digital to analog converters (DAC), embedded or external sensors such as gyroscopes, accelerometers, and position sensors can be coupled to the Peripheral Bridge 119, for example. In FIG. 1, an ADC converter 120 is shown as an example peripheral device. Radio and wireless communications functions such as WiFi, Bluetooth, NFC, and RF and cellular functions can be embedded as additional peripheral units and coupled to the Peripheral Bridge 119.

In addition, the system 100 can also include non-volatile program storage such as FRAM or FLASH memory for storing program code for the LEA in the FRAM/Flash LEA Code block 121, which as shown can also include a portion of read only memory (ROM) containing code used for boot-up or start-up program storage. Finally, additional on-board memory, which can be embedded RAM such as SRAM or DRAM is shown as RAM 123.

The system or integrated circuit 100 includes many elements that are typical for a micro-processor or micro-controller system. In addition, the system 100 includes the LEA processor 105. As is further described below, the LEA 105 provides a low power, high performance, programmable vector processing unit that can perform various vector computations independently from the eCPU 111, so that the eCPU 111 can perform other typical computing tasks while the LEA 105 simultaneously performs vector computations required for certain applications, thereby providing a high performance vector accelerator for system 100. The system 100 can be considered a micro-controller unit (MCU) or, when analog to digital converter peripherals are included, a mixed signal processor (MSP). The various functional blocks in system 100 can be provided, for example, as embedded functions implemented within a single integrated circuit. However, the arrangements of the present application are not limited to a single integrated circuit implementation, and various alternatives include implementing system 100 using multiple chips in a single package, stacked package modules, package on package modules, multi-chip modules, and circuit boards including memory chips, a CPU, and a LEA 105 that can be fabricated as a standalone dedicated integrated circuit or as application specific integrated circuits (ASICs). The LEA 105 can be provided, in one example arrangement, as a completely parameterized ASIP device core for embedding with other known and complete functional cores such as DSP, ARM, CPU, MPU, RISC and the like cores for use in an ASIC device. These and other obvious variations of the example illustrative and non-limiting arrangements that also incorporate novel features that form aspects of the present application are contemplated by the inventors as additional arrangements that fall within the scope of the appended claims.

Figure 2:
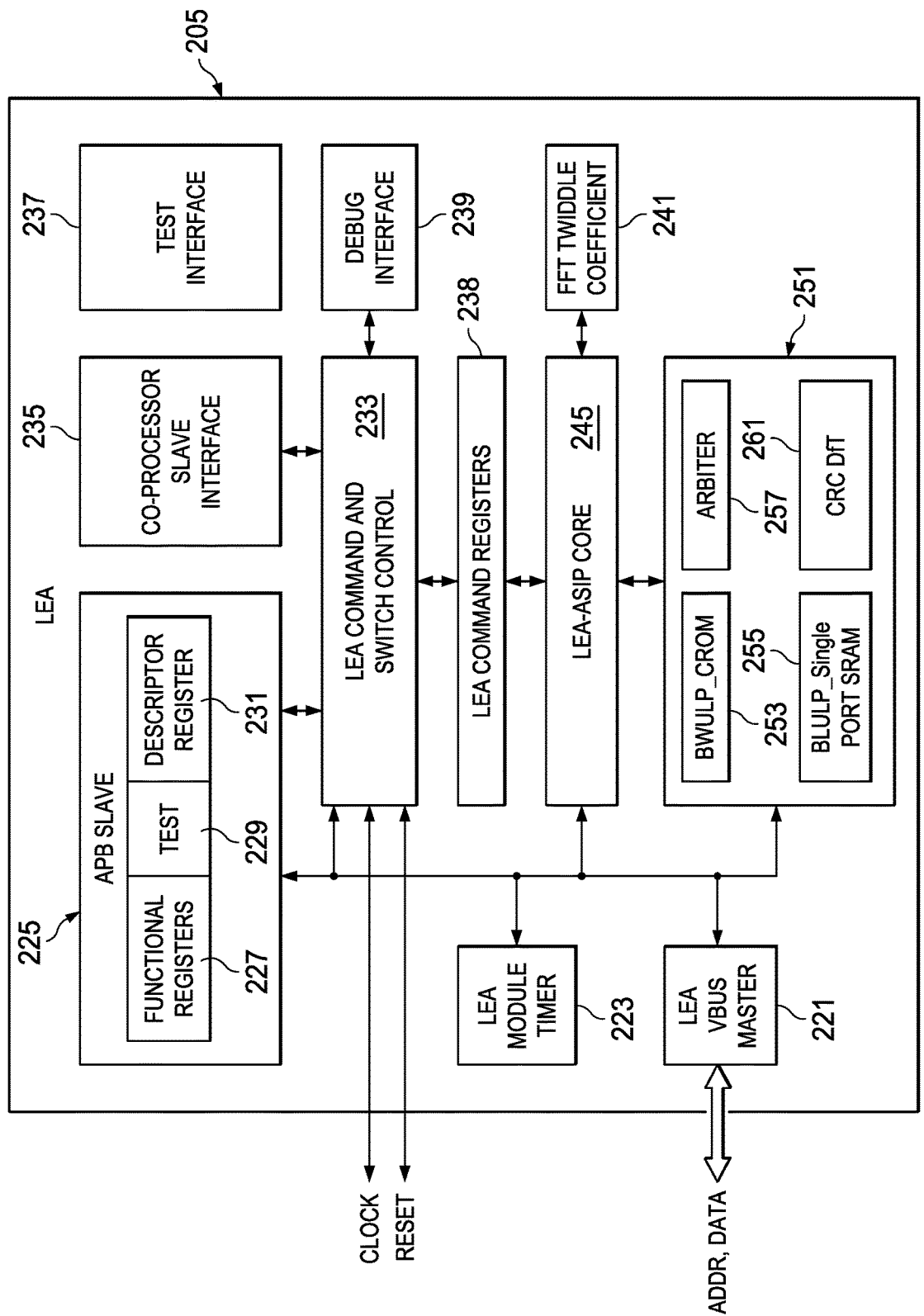
FIG. 2 depicts in a block diagram additional details of the low energy accelerator processor of the system of FIG. 1.

FIG. 2 depicts in another block diagram an example of the detail of the functional blocks used to implement an LEA such as the LEA 105 in FIG. 1. In FIG. 2, a LEA 205 is shown. A LEA command and switch control block 233 is coupled to a local bus. The local bus is also coupled to an APB Slave function 223, which is further implemented as a set of functional registers 227, test functions 229 and descriptor register 231. The APB Slave 225 provides an interface to additional peripheral devices on an advanced peripheral bus (APB). A LEA VBUS Master 221 provides an interface a system bus (such as to the bus matrix 115 of FIG. 1, for example.) A set of LEA command registers 238 is coupled to a LEA-ASIP Core 245. The LEA-ASIP core 245 (ASIP is an abbreviation for Application Specific Integrated Processor) provides the computational core for the LEA 205. A co-processor slave interface 235 couples the LEA to a CPU and allows the LEA to act as a co-processor. The blocks 237 (Test Interface), 239 (Debug Interface), 241 (FFT Twiddle Coefficient) provide additional interfaces and coefficient data storage for the LEA 205. The block 251 provides code ROM 253, a single port SRAM 255, an arbiter 257, and a cyclic redundancy check and DfT module CRC Dft 261 provide a "design for test" interface to allow self-testing and test operations to be performed. Instruction words for the LEA ASIP CORE 245 can be stored in the CODE ROM 253 and the Single Port SRAM can be accessed by the LEA ASIP CORE 245.

In one arrangement that forms an aspect of the present application, the LEA 205 can be embedded as a core function in an integrated circuit that forms a system such as 100 in FIG. 1. Alternatively, LEA 205 can be provided as a stand-alone integrated circuit device, or can be packaged with other devices in a multi-chip module, or can be mounted on a circuit board with other components.

In operation, LEA 205 forms a programmable accelerator that is specifically arranged for performing vector computations that are often used in applications with microcontrollers and mixed signal processors. The LEA 205 is arranged to have a small silicon area (low gate count) and to consume low power when compared to prior known solutions. As is further described below, LEA 205 can execute programs using an instruction set tailored to vector operations such as are used for FFTs, FIR, IIR, filtering, vector signal processing and the like.

The LEA ASIP-Core arrangement of the present application provides a processor with four primary functional units and a program controller to execute instructions in the form of parallel instruction words. As is further described below, a short parallel instruction word (SPIW) arrangement is used. In one example, the use of a short parallel instruction word that is no wider than the width of the memory bus used in the system 100, for example, advantageously reduces the driver devices needed between the memory where the instructions are stored and the LEA ASIP-Core, thus reducing the power consumed for the system busses and allowing a new instruction word to be fetched each cycle, without the need for widening the memory data path. In an alternative arrangement, the system bus can have a data word width that is half the length of the short parallel instruction word so that, if the LEA processor is executing instructions from a memory located on the system bus, two memory accesses will be used to fetch an instruction word. In a further alternative, the instruction words to be executed by the LEA processor can be stored in ROM or SRAM memory within the LEA 205, and in that case, the local bus within LEA 205 can have a width equal to the length of the short parallel instruction word, enabling a new instruction to be fetched each clock cycle.

Because there are 4 functional units arranged with the SPIW to execute an operation for each cycle, the LEA can be referred to as a "4 issue" or "4 slot" architecture. The ISA for the LEA is optimized for both vector computation efficiency and low energy, and is arranged so that the number of gates switching for certain operations is controlled to reduce the active power consumption of the LEA. That is the architecture and the ISA are optimized to reduce power consumption.

Figure 3:
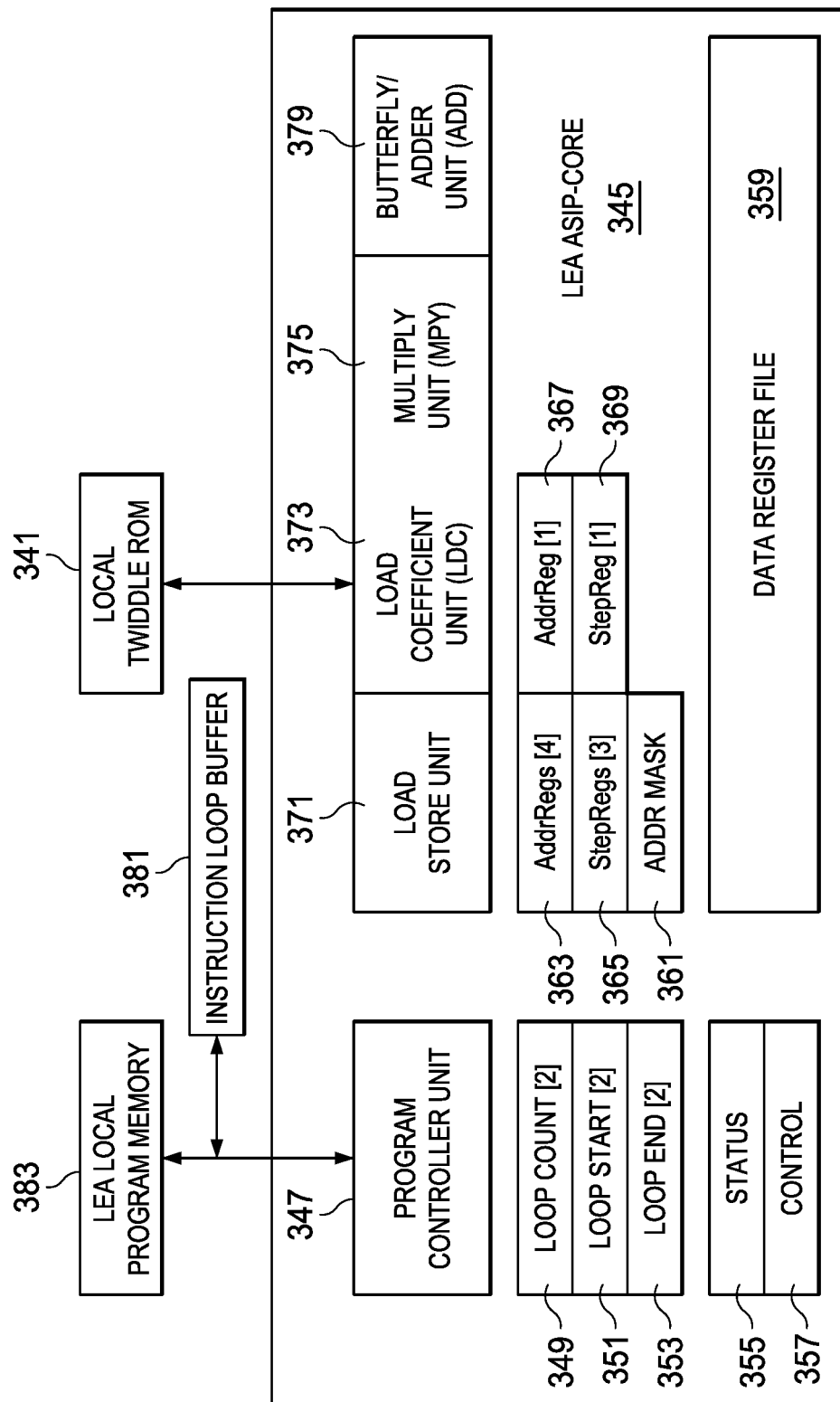
FIG. 3 depicts in a further block diagram the details of a low energy accelerator core of the processor of FIG. 2.

FIG. 3 illustrates in another block diagram additional details for an example ASIP Core implementation to provide the LEA ASIP Core such as 245 in FIG. 2. In FIG. 3, LEA ASIP Core 345 is shown in simplified block diagram form.

In FIG. 3, LEA ASIP-Core 345 includes a Program Controller Unit 347. In the example LEA ASIP-Core 345 shown in FIG. 3, two simultaneous execution loops such as an inner do loop and an outer do loop are supported by a pair of loop count registers 349, two loop start registers 351, and two loop end registers 353. Status and control registers for the program controller unit (355, 357 respectively) provide additional resources for the program controller. The LEA 345 can fetch instruction words from a local memory, LEA Local Program Memory 383, and loop execution is further supported by the Instruction Loop Buffer 381.

The four execution units are the Load Store Unit 371, the Load Coefficient Unit 373, the Multiply Unit 375, and the Butterfly/Adder Unit 377, which is an arithmetic logic unit (ALU) arranged to efficiently compute vector operations such as the butterfly computation used in FFT, FIR, IIR and DCT vector operations, for example.

Additional resources provided in the example LEA ASIP-Core 345 includes four separate address registers 363 coupled to the Load Store Unit 371, three Step Registers 365, and an Address Mask register 361 are coupled to Load Store Unit 371. In addition, the Load Coefficient Unit 373 is coupled to a separate address register 367, a step register 369, and a local ROM, Local Twiddle ROM 341, for use in providing constants for certain computations. The Data Register File 359 is an important feature of the LEA ASIP-Core 345. In the arrangements for the LEA ASIP-Core, the four functional units—the Load Store Unit 371, the Load Coefficient Unit 373, the Multiply Unit 375, and the Butterfly/Adder Unit 377, are each coupled to certain ones of a set of data registers in the Data Register File 359, but the four functional units are not each coupled to all of the registers in the Data Register File. Instead, and in sharp contrast to the prior known approaches, an optimized design of the Data Register File 359 is used to tailor the physical connections needed between the various execution units and the registers in the Data Register File so as to support the vector operations to be performed with the LEA ASIP-Core 345 with a highly reduced gate count. By reducing the physical connections required (typically implemented as multiplexers and demultiplexers, sometimes referred to as "ports") between the registers in the Data Register File 359 and the four functional units, the gate count and silicon area required to fabricate the LEA ASIP-Core 345 is greatly reduced. Further, in a similar manner, the address registers such as 363, the step registers such as 365, for the load store unit, and the address register 367, and the step register 369, also arranged separate from the data registers and are not connected to all of the execution units. In this manner, the number of connections between these address and step registers and the four execution units is again limited to the optimal connections needed to perform selected vector operations, but is not fully orthogonal—that is, some of the execution units have no connections to these resources.

The tradeoff for the reduced silicon area and power saving is that the programming flexibility of the LEA ASIP-Core is limited when compared to the prior known approaches, however by providing the novel instruction set architecture (ISA) that is arranged to be optimized for these hardware limitations of the LEA ASIP-Core 345, the LEA can efficiently perform the vector computations needed in many applications even while providing a processor with a greatly reduced gate count and with correspondingly lower power requirements.

Figure 4:
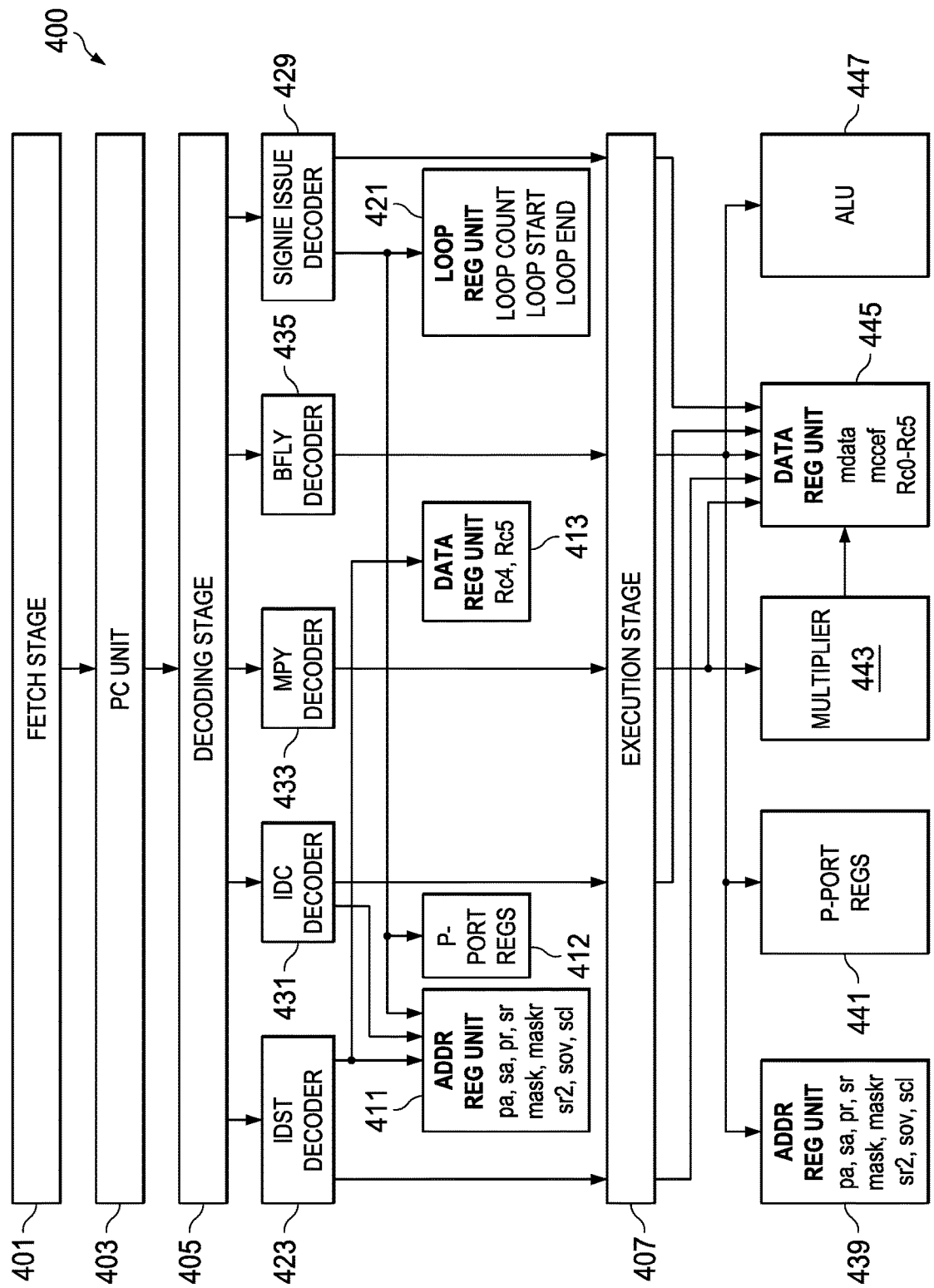
FIG. 4 depicts in a program execution diagram the instruction execution stages for an example arrangement of the present application.

FIG. 4 illustrates an example program execution pipeline diagram for the low energy accelerator processor of the various arrangements that form aspects of the present application. In the non-limiting execution pipeline example shown in FIG. 4, the execution pipeline 400 begins with an instruction fetch operation 401, the fetch operation being controlled by the program controller unit shown as 403 in this example. The fetch operation is followed by an instruction word decoding stage 405. During the decoding stage 405, the instruction word retrieved by the program controller unit 403 at the previous instruction fetch stage 401 is decoded by decoding units that correspond to the various execution units of the low energy accelerator core. For example, a load store decoder labeled "ldst decoder" 423 decodes a portion of the instruction word that provides an op-code for the load store unit. Similarly, a load coefficient decoder labeled "ldc decoder" 431 decodes a portion of the instruction word at the decoding stage 405 that provides an op-code for the load coefficient unit. A decoder labeled "mpy decoder" 433 decodes a portion of the instruction word at the decoding stage 405 that provides an op-code for the multiplier execution unit. A decoder labeled "bfly decoder" 435 also decodes another portion of the instruction word at the decoding stage 405 that provides an op-code for the butterfly/ADD execution unit, which is an ALU. An additional decoder labeled "single issue decoder" 429 decodes a portion of the instruction word at the decoding stage 405 that corresponds to the looping and program counter functions supported by the program control unit.

These decodes can be used to set up operations that will be executed by the LEA at the execution stage by units such as the ADDR Reg. Unit 411, the peripheral port register unit 412, the data path register unit 413 and the loop register unit 421 are shown coupled to the decoders.

An execution stage 407 in the program execution diagram of FIG. 4 illustrates the execution of the previously decoded instruction word by the execution units of the LEA, following the decoding stage 405. During the execution stage 407, the execution units of the LEA perform in parallel the indicated operation according to the op-codes decoded from the instruction word at decoding stage 405.

Because the LEA instruction execution is pipelined, a new instruction word can be executed each cycle. The fetch stage 401, the decoding stage 405, and the execution stage 407 each operate every machine cycle so that the LEA performs a new operation corresponding to a new instruction word each cycle. The machine cycle can correspond to a single system clock cycle, in some arrangements. In other arrangements the machine cycle can correspond to a divided down clock cycle. As is known to those skilled in the art, for CMOS technology integrated circuits where power consumption is roughly directly proportional to switching speed, a reduced clock speed can be used in some non-critical operations to further reduce power consumption. For highest computation performance the execution pipeline would be clocked so that a new instruction word is fetched for each clock cycle.

At the execution stage 407, the decoded instruction word op-codes can control the operations performed by the LEA functional units and other hardware resources including, in the example of FIG. 4, the address registers labeled "ADDR. Reg. Unit" 439, the Peripheral Port Registers "P-Port Regs" labeled 441, the Multiplier 443, the DATA-PATH Reg. Unit numbered 445, and the ALU 447.

Figure 5:
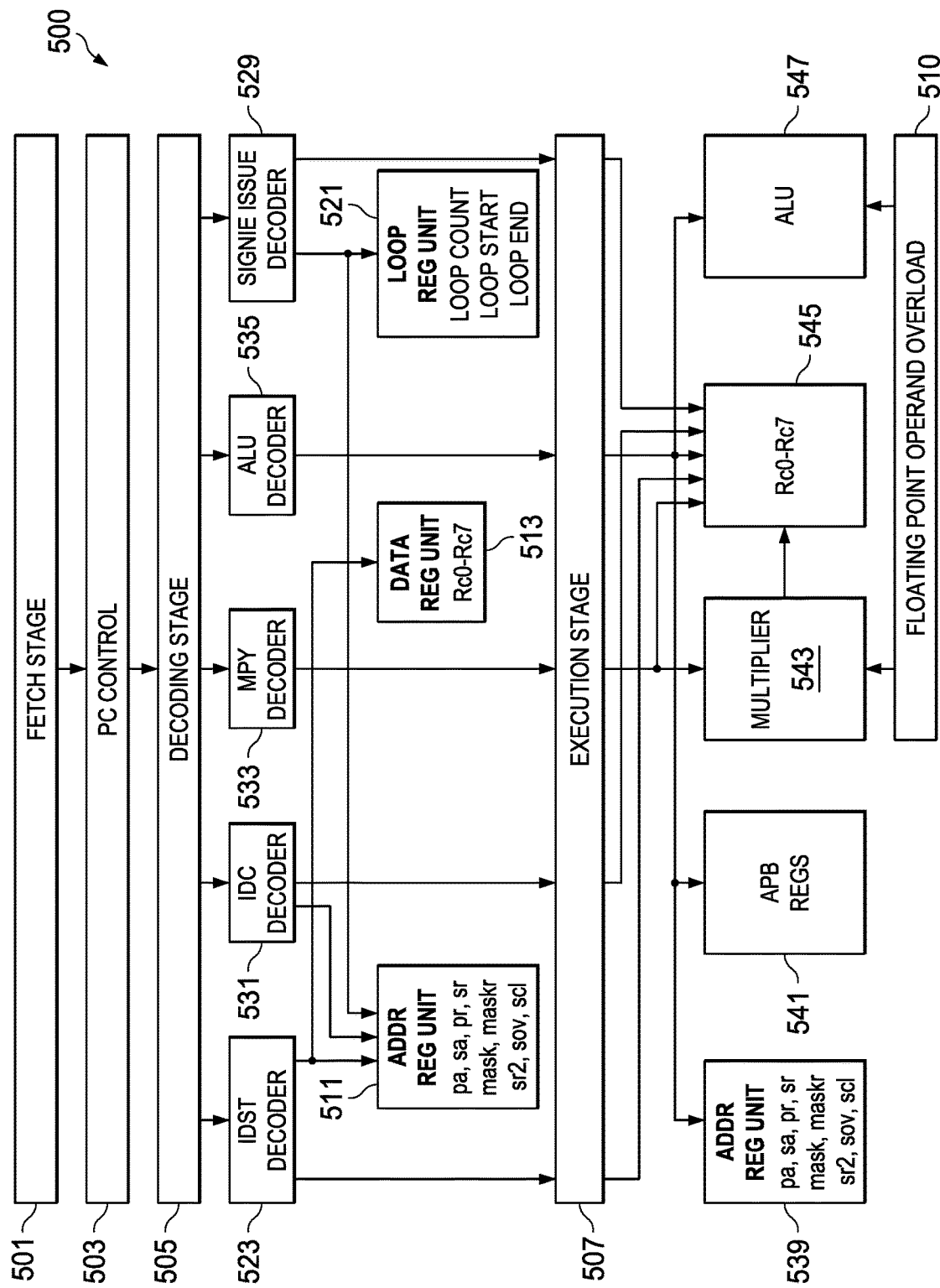
FIG. 5 depicts in another program execution diagram the instruction execution stages for an alternative example arrangement of the present application.

FIG. 5 depicts an alternative arrangement that adds additional features to the LEA processor core. In performing vector operations, computations can be performed as "fixed point" and "floating point" operations. In some vector computations both forms can be used at different steps of the computation. In the LEA arrangement described above, the LEA core processor has a multiplier execution unit and butterfly/ADD ALU execution unit that are configured to perform only fixed point computations. Using a fixed point processor, it is possible to perform a floating point computation by developing code for a software routine to perform the calculation, however for a fixed point accelerator to perform this calculation using software will take many clock cycles. Another approach is to provide an additional dedicated floating point hardware accelerator. If both a fixed point and a floating point accelerator are provided, however, the silicon area needed, and the corresponding power consumed, will be increased.

In another alternative arrangement that forms an additional aspect of the present application, a LEA core processor is provided with a multiplier functional unit and a butterfly/ADD ALU functional unit that can perform both fixed and floating point computations, while the remaining functional units remain as before. In this manner, by adding only the minimum additional gates needed to support the additional floating point operations, the remaining functional units, the load store unit, the load coefficient unit, and the program controller, can remain unchanged. The alternative LEA processor core can then perform both fixed point and floating point vector computations.

In an additional arrangement that provides an additional aspect of the present application, an operand overload function is provided. In this arrangement, the instruction set architecture (ISA) and the instruction word lengths can be re-used from the fixed point arrangement. Many instructions developed for the fixed point LEA processor described above can be used with this additional arrangement without modification. In another arrangement that forms an additional aspect of the present application, a floating point operand overload flag is used to indicate when a floating point operation is to be performed. The operand overload flag is coupled to the functional units, the multiplier and the butterfly/ADD ALU functional units, that perform either floating point or fixed point computations. This operand overload approach advantageously allows re-use of most of the LEA code developed for fixed point computations, reducing the amount of code development needed to implement the additional floating point instructions. In an example arrangement, the LEA instruction word remains the same length as the memory data path width, for example 32 bits, which further enhances low energy performance by reducing the amount of drivers needed for retrieving the instruction words from memory and to transmit the instruction words on the system bus. The multiplier unit and the ALU unit will have a slightly increased silicon area to support the floating point computations over the fixed point computation LEA core processor described above, but the rest of the LEA core processor design described above can be re-used. In an alternative arrangement, the system memory bus can be reduced to a smaller word width such as 16 bits, while the short parallel instruction word remains at 32 bits. This arrangement can save even more gates, but requires two memory accesses to fetch an instruction word from a memory located on the system bus. However in a further arrangement, the instruction words for the LEA processor can be stored in a local FLASH or SRAM memory within the LEA, and thus, the instruction words can be fetched each clock cycle in this arrangement, freeing the system bus for other operations and increasing performance.

FIG. 5 illustrates the instruction execution pipeline diagram for the example floating point LEA processor core. In most respects the execution pipeline diagram of FIG. 5 is the same as that of FIG. 4, for fixed point computations. In FIG. 5, pipeline 500 includes a fetch stage 501 for fetching a new instruction word from a memory, a PC Controller 503 determining the instruction to be fetched. The instruction word is then moved to the decoding stage 505. Decoders associated with the functional units decode the instruction word to provide op-codes for the four functional units at the decoding stage 505. A load store decoder labeled "ldst decoder" and numbered 523 in FIG. 5 decodes the bits in the instruction word that correspond to the load store unit. A load coefficient decoder labeled "ldc decoder" and numbered 531 decodes the bit (in the ISA examples herein a single bit of the instruction word provides the ldc opcode) for the load coefficient unit. A multiply decoder labeled "mpy decoder" and numbered 533 decodes the bits in the instruction word that correspond to the opcode for the multiplier functional unit. In addition, in this arrangement for the LEA, the multiplier receives the floating point operand overload from the flag 510 labeled "floating point operand overload" and this flag indicates when a floating point, or a fixed point, computation is to be performed. An ALU decoder 535 decodes the portion of the instruction word that corresponds to the butterfly/Adder ALU, and in addition the ALU decoder receives the floating point operand overload from the flag 510 labeled "floating point operand overload" and this flag indicates when a floating point, or a fixed point, computation is to be performed. Also, a single issue decoder 529 decodes the bits in the instruction word that correspond to program control operations such as loop count, return, etc. and the loop functions are updated using that information at the loop register unit 521.

After the decoding stage shown at 505 in the instruction execution pipeline 500 is performed, the instruction word is executed by the functional units at the execution stage 507. The multiplier 543, and the ALU 547, now include the capability to perform floating point computations as well as fixed point computations. The functional units determine whether a fixed point or floating point operation is to be performed based on an operand overload flag 510.

Figure 6:
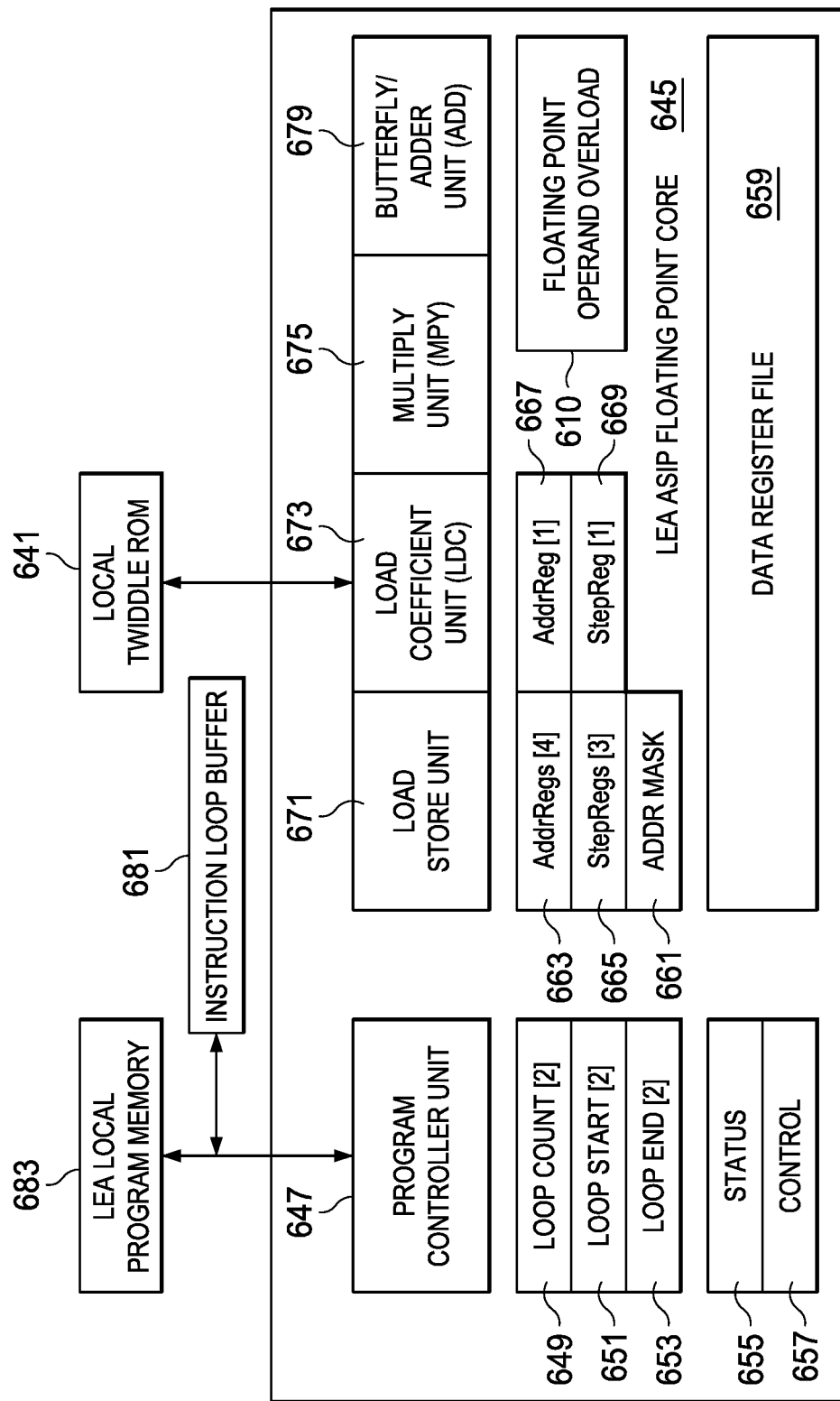
FIG. 6 depicts in a further block diagram an alternative low energy accelerator core arrangement of the present application.

FIG. 6 illustrates in another block diagram additional details for an example ASIP Core implementation to provide the LEA ASIP Core and including floating point capability. In FIG. 6, the block diagram is similar to the LEA ASIP Core 345 of FIG. 3, but includes floating point capability. In FIG. 6, LEA ASIP Core 645 is shown in simplified block diagram form.

In FIG. 6, LEA ASIP-Core 645 includes a Program Controller Unit 647. In the example LEA ASIP-Core 345 shown in FIG. 3, two simultaneous execution loops such as an inner do loop and an outer do loop are supported by a pair of loop count registers 649, two loop start registers 651, and two loop end registers 653. Status and control registers for the program controller unit (655, 657 respectively) provide additional resources for the program controller. As described above with respect to the example LEA of FIG. 3, the LEA 645 can fetch instruction words from a local memory, LEA Local Program Memory 683, and loop execution is further supported by the Instruction Loop Buffer 681.

The four execution units are the Load Store Unit 671, the Load Coefficient Unit 673, the Multiply Unit 675, and the Butterfly/Adder Unit 679, which is an arithmetic logic unit (ALU) arranged to efficiently compute vector operations such as the butterfly computation used in FFT, FIR, IIR and DCT vector operations, for example.

Additional resources provided in the example LEA ASIP-Core 645 includes four separate address registers 663 coupled to the Load Store Unit 671, three Step Registers 665, and an Address Mask register 661 are coupled to Load Store Unit 671. In addition, the Load Coefficient Unit 673 is coupled to a separate address register 667, a step register 669, and a local ROM, Local Twiddle ROM 641, for use in providing constants for certain computations. The Data Register File 659 is an important feature of the LEA ASIP-Core 645. In the arrangements for the LEA ASIP-Core, the four functional units—the Load Store Unit 671, the Load Coefficient Unit 673, the Multiply Unit 675, and the Butterfly/Adder Unit 679, are each coupled to certain ones of a set of data registers in the Data Register File. In an example arrangement, the Data Register File is arranged as 8 32 bit wide registers Rc0-Rc7. As described above, an important feature of the LEA ASIP Core is that the Data Register File is optimized for a reduced gate count and thus, lower power consumption. This is achieved because the four functional units are not each coupled to all of the registers in the Data Register File. Instead, and in sharp contrast to the prior known approaches, an optimized design of the Data Register File 659 is used to tailor the physical connections needed between the various execution units and the registers in the Data Register File so as to support the vector operations to be performed with the LEA ASIP-Core 645 but with a highly reduced gate count. In a further novel feature, the address registers for the functional unit are also non-orthogonal, that is, the address registers such as 663, 665 for the load store unit, are not connected or available to each of the four execution units, instead, the connections between the address registers and the execution units are minimized to those needed for particular vector operations, further reducing gate count over prior known solutions.

The tradeoff for the reduced silicon area and the corresponding power savings is that the programming flexibility of the LEA ASIP-Core is limited (less flexible when compared to the prior known approaches), however by providing the novel instruction set architecture (ISA) that is arranged to be optimized for these hardware limitations of the LEA ASIP Floating Point Core 645, the LEA can still efficiently perform the vector computations needed in many applications even while providing a processor with a greatly reduced gate count and with correspondingly lower power requirements.

In addition to these features, the LEA ASIP Floating Point Core 645 includes an operand overload flag 610. This addressable register or flag can be set prior to a computation and when it is set, the multiply unit 675 and the Butterfly/Adder unit ALU 679 will perform floating point operations. Because the operand overload feature is implemented without the need for additional opcodes and bits in the instruction word, in one example arrangement the length of the instruction word is maintained at a length that is equal to or less than the memory system data bus width. In an example arrangement 32 bits are used for the instruction word and also as the memory data bus width. Alternatively the length of the instruction word can be equal to two memory words. Further, most of the code developed for fixed point operations for the LEA Core can be retained and re-used with very slight modification to implement floating point computations, using the operand overload feature. Stored code for LEA fixed point vector operations can be easily extended to the floating point version of the LEA Core without the need for redeveloping the software programs from scratch.

In using the LEA Core, the reduced programming flexibility that occurs due to the optimized data register file design, the optimized address register connections, and the short parallel instruction word is easily addressed by developing prewritten code for a wide variety of vector operations which can be re-used and which can be supplied already stored in the LEA Code memory. In this feature of the arrangements, a user of the LEA processor is not impacted by the additional constraints on the programming of the LEA Core, because the user can rely on previously developed and verified code programs for the commonly needed vector operations. The LEA Core can therefore be rapidly applied to a customer application without the need to rewrite code or to develop new code.

Although the LEA instruction word is relatively short in the arrangements that form various aspects of the present application, in another feature of the arrangements, the instruction set architecture, and the hardware blocks of the LEA of the present application, are yet still arranged to efficiently perform vector operations that are often required by a mixed signal processor or micro-controller unit. By optimizing the instruction set architecture for the particular features of the LEA core, an efficient vector computation accelerator processor is achieved. In contrast to a dedicated hardware accelerator of the prior known approach, the LEA core processor arrangements of the present application are programmable and can perform a variety of vector operations. Using a software compiler and a library of code macros, a variety of vector computation programs such as FFT, DFT, DCT, FIR, and the like can be provided already completed for use with the LEA to enable rapid development of application code. Further, and unlike the dedicated hardware accelerators of the known prior solutions, in the novel arrangements of the present application the code used to cause the LEA core processor to perform these vector operations flexible and can be altered after an integrated circuit device including the LEA core processor is manufactured, so the devices are "future proofed," and the operation of the devices can be altered in the field or after production, reducing the costs for improvements or modifications that may be needed later.

FIG. 7 depicts in a combined opcode encoding chart a summary of an example instruction set architecture (ISA) for an LEA processor arrangement that forms an additional aspect of the present application. In FIG. 7, the instruction set architecture is shown in chart 700 using an example 32 bit instruction word width. Because the instruction word width is relatively short at 32 bits, the instruction word can be transmitted from a local memory store or a RAM or FLASH location using the system data bus width and without the need for a wider bus, and thus without the need for additional driver devices and power to supply the drivers for a wider instruction word. In an alternative approach the system data bus width can be half the length of the short parallel instruction word, so that two memory accesses can provide an instruction word. In contrast to the very long instruction word (VLIW) architectures of the prior known approaches, which can use an instruction word that is 64, 128 or even 256 bits wide, the arrangements for the low energy accelerator use, in this example, only 32 bits are used. Matching the instruction short parallel instruction word width to the memory bus width, or to twice the memory bus width, results in substantial reduction in the silicon area required and a corresponding reduction in power consumption. It also increases performance because a new instruction word can be fetched each memory cycle or for every two memory cycles. In an alternative arrangement that is also contemplated as providing a further aspect of the present application, the system bus width could be 16 bits, while the short parallel instruction word remains at 32 bits. If the LEA processor is retrieving instruction words from a memory coupled on the system bus in this arrangement, the instruction fetch would require two sequential accesses to memory over the system bus. However in additional arrangements the instruction words can be stored in flash or ROM memory positioned within the LEA processor and having a local bus of 32 bits in width, thereby enabling the LEA processor to retrieve new instruction words each clock cycle.

In the arrangements of the present application, the LEA processor core includes four functional units and uses a single issue instruction word. This approach can be referred to as a "4 slot" or "4 issue" architecture. In addition to opcodes for the four functional units in each instruction word, program controller information such as loop count, return, do-loop instruction information are provided in the instruction word. A single instruction word provides all of the opcode information needed for each machine cycle, so the architecture is a single issue architecture.

Further, while the ISA is arranged as a "4 slot" architecture, the ISA also provides for each of the four execution units the possibility of a no operation or NOP instruction for an execution unit. Thus a particular instruction word could be a three slot or two slot instruction.

As can be seen by examination of FIG. 7, the instruction word has fields that correspond to the execution units of the LEA as described above. In the example ISA shown in FIG. 7, the first bit, bit 0, is used to distinguish between "1 slot" and "4 slot" instructions. The bits 1-11 of the 32 bit instruction word are used to provide opcodes to the load-store execution unit, in the column labeled "ls: ldstA" a summary of some of the operations for the load store unit are shown with their encoding. A single bit, in this non-limiting example arrangement bit 12 is used, provides a control field for the load coefficient execution unit, in the column labeled "ld: ld_R," this bit is shown with encoding for certain operations. An opcode field for the multiplier in this example is provided by bits 13-18, and in the column labeled "m: mpy," selected operations are shown for this functional unit with some example encoding. The remaining bits of the instruction word, bits 19-31 in this example arrangements, provide the op-codes for controlling the operations of the butterfly/add ALU execution unit. In the column labeled "b:bfly," some selected operations for this execution unit are shown with their encoding.

Additional "1 slot" operations are shown such as "lshift," "rshift," "pass," "cmpr," "doloop," and "return" for example that are encoded in the bottom rows of table 700 when the first bit, bit 0, is a "1." The LEA instruction set is tailored to fit in the 32 bit word length while providing a four slot, single issue instruction word so that each execution unit, the load store unit, the load coefficient unit, the multiplier, and the butterfly/ADD ALU unit, can execute an operation for each LEA machine cycle. Further, the ISA includes "1 slot" instructions that affect the program counter, stack pointer, load immediate or store with immediate operands, and register initializations as are described in more detail below.

Although an example ISA arrangement is illustrated in FIG. 7, it should be understood that obvious variations can be made to the example which are still within the scope of the present application and these variations are contemplated by the inventors as forming additional arrangements that are within the scope of the present application and which are covered by the appended claims. For example, although bits 1-11 were chosen for the opcodes for the load store unit in the ISA shown in FIG. 7, another set of bits of similar length could be used instead, such as 21-31; without departing from the scope of the present application. More or fewer bits could be used for any one of the execution unit opcodes. The overall relatively short length of the parallel instruction words are important aspects of the arrangements, but the particular bits assigned to an execution unit can be modified to create additional alternative arrangements of the present application.

FIG. 8 depicts in an additional table 800 additional opcode encoding for the load store unit. In FIG. 8, additional operations are detailed with the encoding of bits 1-11 providing operations for the load store unit as part of the short parallel instruction word. In FIG. 8, the opcodes include load, store, and store overflow operations. NOP operations allow the load store unit to remain idle while other execution units are active.

FIG. 9 depicts in an additional table 900 some additional opcodes for the load store execution unit. In FIG. 9, the bits 1-11 are again shown with additional operations for the load store unit to perform. NOP operations (all '1s' in this example ISA encoding) allow the load store unit to remain idle while other execution units are active.

FIG. 10 depicts in an additional table 1000 the opcodes for the load coefficient execution unit, which in an additional aspect of the present application, requires only a single instruction word bit, bit 12 in the example ISA. A NOP instruction is available for the load coefficient execution unit as well.

FIG. 11 depicts in yet another table 1100 additional details of opcodes for the multiply execution unit in the example ISA. In FIG. 11, operations such as various multiply operations and a no operation instruction NOP are shown using bits 13-18 in the instruction word.

FIG. 12 depicts in a further table 1200 a portion of the opcodes used to determine the operation the butterfly/ADD ALU execution unit is to perform. In table 1200 a first set of operations are shown. FIGS. 13, 14 and 15 each depict additional opcodes for the butterfly/ADD ALU unit in tables 1300, 1400 and 1500, respectively. In the example ISA described here, the bits 19-31 of the instruction word are used for the butterfly/ADD ALU execution unit. However alternative arrangements that can be created by varying the particular portion of the instruction word used for the butterfly/ADD ALU execution unit, or the bits for the other execution units, are contemplated by the inventors as forming additional arrangements that form further aspects of the present application and which are within the scope of the appended claims.

FIG. 16 depicts in another table 1600 a portion of the opcodes used to determine "1 slot" operations. In the example encoding for the ISA in FIG. 16 and in FIG. 7 above, when the first bit, bit 0, is a "1" a "1 slot" operation is indicated. As shown in table 1600, these operations include certain shift operations, load immediate or "ld_imm" operations, load or store operations with immediate operands such as "ls_sp_off", stack pointer update operations such as "add_imm_SP", and program controller (PC) operations such as "pc_dcnt" operations shown in table 1600.

An important feature of the arrangements is that the length of the short parallel instruction word can be less than or equal to the width of the system bus. In an alternative arrangement, the short parallel instruction word can be 32 bits, for example, while the system bus is only 16 bits in width, thus in this alternative arrangement the instruction words would require two memory accesses if the instruction words are stored on a memory coupled to the system buss, however instruction words for the LEA processor can be stored in local ROM or FLASH memory within the LEA processor, in that case the instruction words can be fetched in a single clock cycle.

In the arrangements for the LEA processor described above, the four execution units receive a new opcode that can be executed with each new instruction word. The opcodes selected for the ISA and arranged as shown above are optimized for the vector operations and for low power consumption. The use of the operand overload to indicate when the floating point operations are to be performed provides the capability of keeping the short parallel instruction word the same length while adding the floating point capabilities. The instruction words for fixed point operations are also used with the floating point operations, so that code written for the fixed point LEA processor can be reused for floating point computations with little or no modifications.

Various modifications can also be made in the order of steps and in the number of steps to form additional novel arrangements that incorporate aspects of the present application, and these modifications will form additional alternative arrangements that are contemplated by the inventors as part of the present application and which fall within the scope of the appended claims.

Although the example illustrative arrangements have been described in detail, it should be understood that various changes, substitutions and alterations can be made herein without departing from the spirit and scope of the present application as defined by the appended claims. Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. A data processor, comprising:
   a memory configured to store instruction words;
   a system bus coupled to the memory; and
   a processor coupled to the system bus and configured to execute the instruction words, and further comprising:
      load register;
      a destination register;
      an operand overload register comprising a flag;
      a programmer controller unit configured to retrieve the instruction words from the memory; and
      a load store execution unit configured to load data based on the instruction words and store the load data to the load register in the processor;
      a multiply execution unit configured to perform multiply operations on the load data based on the instruction words and store a result in the destination register; and
      an arithmetic logic unit (ALU) execution unit configured to:
         perform butterfly and adder operations on the load data in either floating point or fixed point, wherein performing in either floating point or fixed point is based on the flag in the operand overload register; and
         store a result in the destination register.

2. The data processor of claim 1 and further comprising a central processor unit coupled to the system bus.

3. The data processor of claim 1, wherein the processor is further configured to execute fixed point and floating point computations.

4. The data processor of claim 3, wherein:
   the multiply execution unit configured to perform multiply operations in fixed point and floating point form responsive to an operand overload flag in the operand overload register indicating a floating point operation;
   the ALU execution unit is configured to perform butterfly and ADD operations in fixed point responsive to the operand overload flag indicating a floating point operation; and
   the processor further comprises an operand overload register outputting the operand overload flag.

5. The data processor of claim 1, wherein the instruction words have a data width that is less than or equal to 32.

6. The data processor of claim 1, wherein the ALU execution unit perform butterfly and adder operations in response to an operand overload flag in the operand overload register indicating a floating point operation.

* * * * *